(12) United States Patent
Cope

(10) Patent No.: US 11,810,199 B1
(45) Date of Patent: Nov. 7, 2023

(54) TRANSPORTATION ANALYTICS SYSTEMS AND METHODS USING A MOBILITY DEVICE EMBEDDED WITHIN A VEHICLE

(71) Applicant: State Farm Mutual Automobile Insurance Company, Bloomington, IL (US)

(72) Inventor: Craig Cope, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 319 days.

(21) Appl. No.: 17/037,161

(22) Filed: Sep. 29, 2020

Related U.S. Application Data

(60) Provisional application No. 62/966,789, filed on Jan. 28, 2020.

(51) Int. Cl.
| | |
|---|---|
| *G06Q 40/08* | (2012.01) |
| *G06Q 50/30* | (2012.01) |
| *G06Q 30/0283* | (2023.01) |
| *G06Q 20/12* | (2012.01) |
| *G07C 5/00* | (2006.01) |
| *G06F 16/2458* | (2019.01) |

(Continued)

(52) U.S. Cl.
CPC ............ *G06Q 40/08* (2013.01); *B60R 25/20* (2013.01); *G06F 16/2477* (2019.01); *G06Q 20/127* (2013.01); *G06Q 30/0284* (2013.01); *G06Q 50/30* (2013.01); *G07C 5/008* (2013.01); *H04L 67/12* (2013.01); *H04L 67/306* (2013.01); *H04Q 9/00* (2013.01); *B60R 2325/10* (2013.01); *B60R 2325/205* (2013.01); *B60R 2325/30* (2013.01)

(58) Field of Classification Search
CPC ..................................................... G06Q 40/08
See application file for complete search history.

(56) References Cited

U.S. PATENT DOCUMENTS

| | | | |
|---|---|---|---|
| 8,750,853 | B2 | 6/2014 | Abramson et al. |
| 8,838,088 | B1 | 9/2014 | Henn et al. |
| (Continued) | | | |

OTHER PUBLICATIONS

Blockchain and IoT Data Analytics for Fine-Grained Transportation Insurance, IEEE 2018 (Year: 2018).*

(Continued)

*Primary Examiner* — Bruce I Ebersman
(74) *Attorney, Agent, or Firm* — Armstrong Teasdale LLP

(57) ABSTRACT

A transportation analytics (TA) computing device may be provided. The TA computing device may include at least one processor and/or associated transceiver. The at least one processor and/or associated transceiver may be configured to: (1) receive, from a user mobile device, telematics data including an indicator that the user mobile device is communicatively linked to a transportation device; (2) identify each period that the user mobile device is communicatively linked to a transportation device as a trip using the transportation device; (3) store, the telematics data in a database in association with a trip identifier corresponding to the identified trips and a time stamp; (4) perform a lookup in the database to identify, based upon the timestamps, telematics data corresponding to a time period; and/or (5) calculate, based upon the identified telematics data, a premium amount for insuring the user during the trips taken during the time period.

14 Claims, 8 Drawing Sheets

(51) Int. Cl.
*H04Q 9/00* (2006.01)
*H04L 67/12* (2022.01)
*B60R 25/20* (2013.01)
*H04L 67/306* (2022.01)

(56) References Cited

U.S. PATENT DOCUMENTS

| | | | |
|---|---|---|---|
| 9,082,144 | B2 | 7/2015 | Jones et al. |
| 9,086,948 | B1 | 7/2015 | Slusar et al. |
| 9,296,299 | B2 | 3/2016 | Ricci |
| 9,311,271 | B2 | 4/2016 | Wright |
| 9,633,487 | B2 | 4/2017 | Wright |
| 9,672,570 | B1* | 6/2017 | Slusar ............ G08G 1/20 |
| 10,192,369 | B2 | 1/2019 | Wright |
| 10,198,879 | B2 | 2/2019 | Wright |
| 10,430,883 | B1* | 10/2019 | Bischoff ............ G06Q 20/102 |
| 10,664,917 | B1* | 5/2020 | Wasserman ......... G01C 21/3453 |
| 10,776,879 | B1* | 9/2020 | Floyd ............ G06F 16/27 |
| 10,785,604 | B1 | 9/2020 | Kumar et al. |
| 10,817,950 | B1* | 10/2020 | Iqbal ............ G07C 5/008 |
| 10,956,982 | B1* | 3/2021 | Hayward ......... G07C 5/008 |
| 2011/0288891 | A1 | 11/2011 | Zaid et al. |
| 2013/0190097 | A1 | 7/2013 | Shealy |
| 2013/0190967 | A1 | 7/2013 | Hassib et al. |
| 2014/0095214 | A1 | 4/2014 | Mathe et al. |
| 2014/0108058 | A1 | 4/2014 | Bourne et al. |
| 2014/0278574 | A1* | 9/2014 | Barber ............ B60W 40/09 705/4 |
| 2015/0079923 | A1* | 3/2015 | McNeil ............ H04W 4/027 455/404.2 |
| 2015/0187019 | A1 | 7/2015 | Fernandes et al. |
| 2016/0171624 | A1 | 6/2016 | Berg et al. |
| 2017/0021764 | A1 | 1/2017 | Adams et al. |
| 2017/0069144 | A1 | 3/2017 | Lawrie-Fussey et al. |
| 2017/0089710 | A1 | 3/2017 | Slusar |
| 2017/0116696 | A1 | 4/2017 | Moore |
| 2017/0191846 | A1 | 7/2017 | Chintakindi et al. |
| 2017/0241791 | A1* | 8/2017 | Madigan ............ G06Q 40/08 |
| 2017/0255966 | A1 | 9/2017 | Khoury |
| 2018/0075747 | A1 | 3/2018 | Pahwa |
| 2019/0026364 | A1 | 1/2019 | Sankovsky |
| 2019/0066535 | A1 | 2/2019 | Pifko |
| 2020/0094851 | A1 | 3/2020 | Smye-Rumsby et al. |
| 2020/0104876 | A1 | 4/2020 | Chintakindi et al. |
| 2020/0273113 | A1 | 8/2020 | Walsey et al. |
| 2021/0166322 | A1 | 6/2021 | Allen et al. |
| 2021/0166323 | A1 | 6/2021 | Fields et al. |

OTHER PUBLICATIONS

The Evolution of Artificial Intelligence in the Automotive Industry IEEE 2021 (Year: 2021).*
Big Data for Social Transportation IEEE 2016 (Year: 2016).*
Big Data Analytics in Intelligent Transportation Systems: A Survey IEEE 2018 (Year: 2018).*
Dorsey, "Lyft Officially Launches $300 Monthly Subscription—With Hopes of Ending Car Ownership", Web Article, The Points Guy, Oct. 16, 2018, 5 pages, accessed online at URL: https://thepointsguy.com/news/lyft-launches-subscription-all-access-plan-available-nationwide/.
Guo et al., "Understanding Ride-on-demand Service: Demand and Dynamic Pricing", The First Workshop on Pervasive Smart Living Spaces, IEEE, 2017, 6 pages.
Holt, "Uber tests a $25 Pass that covers Eats and transportation", Web Article, Engadget, Jul. 22, 2019, 5 pages, accessed online at URL: https://www.engadget.com/2019-07-22-uber-subscription-service-eats-jump.html.
Ilie et al., "Theoretical Feasibility of a Fleet of Crowd Supplied Rental Vehicles", 2019 23rd International Conference on System Theory, Control, and Computing (ICSTCC), IEEE, 2019, 6 pages.
Sawyer, "Hyundai Reveals Electric Scooter That Could Be Featured in Future Vehicles", Web Article, HIGHSNOBRIETY, 2019, 1 page, accessed online at URL: https://www.highsnobiety.com/p/hyundai-electric-scooter/.
Big Data for Social Transportation, IEEE (Year: 2016).
An Unlicensed Taxi Identification Model Based on Big Data Analysis, IEEE (Year: 2016).

* cited by examiner

TRANSPORTATION ANALYTICS SYSTEMS AND METHODS USING A MOBILITY DEVICE EMBEDDED WITHIN A VEHICLE

CROSS-REFERENCE TO RELATED APPLICATIONS

This application claims the benefit to U.S. Provisional Patent Application No. 62/966,789, filed Jan. 28, 2020, the entire contents and disclosures of which are herein incorporated by reference in their entirety.

FIELD OF THE INVENTION

The present disclosure relates to transportation analytics for vehicles and, more particularly, to systems and methods for transportation analytics using a mobility device embedded within a vehicle.

BACKGROUND

Individuals use mobile devices (e.g., mobile telephones) for a variety of purposes and often carry mobile devices while traveling. Such usage may be source of data. For example, mobile devices may be equipped to generate data (e.g., telematics data) using instruments built into the mobile device, such as an accelerometer or global positioning system (GPS) device. This data obtained from mobile devices may be useful for a variety of applications.

However, there may be current limitations in the ability of computing devices to utilize such data in automated processes. For example, known usage-based insurance applications may have several drawbacks or limitations. In order to implement these applications, different forms of information may need to be reconciled by human beings, which may result in lack of timeliness, inaccuracies, inconvenience, or other drawbacks. Further, the premium may vary from period to period, which increases the complexity of the payment process for insured users, insurers, and/or other entities related to the insurance transaction.

BRIEF SUMMARY

The present embodiments may relate to, inter alia, systems and methods for generating transportation analytics using a mobility device embedded within a vehicle. In one aspect, an improved system and method may provide usage-based insurance (UBI) based upon an individual driver's actual driving behavior determined from telematics data. UBI may include insurance that is paid for by time or distance. For instance, UBI may provide insurance coverage by mile traveled, or by period of time—such as hourly, daily, weekly, or monthly insurance or insurance by the hour, day, week, month, or other time period.

In exemplary embodiments, the systems and methods may be performed by a transportation analytics ("TA") computing device. The TA computing device may collect and analyze telematics data (e.g., acceleration, position, velocity, orientation, etc.) gathered by a mobile device of a user during a trip of the user. For example, the user may use the mobile device to obtain a ride via a transportation platform (e.g., a rideshare, bike share, and/or powered scooter share platform), and the TA computing device may receive telematics data collected by the mobile device during the ride. Additionally, the user may obtain a ride using a transportation device (e.g., a motor vehicle, bicycle, powered scooter, and/or other transportation device) capable of communicatively linking to the mobile device of the user, and the TA computing device may receive telematics data from the mobile device collected during the trip taken using the linked vehicle. The TA computing device may identify trips based upon the telematics data and use the telematics data to analyze the transportation behavior of the user, for example, to calculate an insurance premium. An insurer and/or transportation platform may provide an insurance subscription to the user that may have a premium that is calculated based upon use of the transportation platform. The TA computing device may, in response to calculating the insurance premium, automatically transfer the insurance premium from the insured user to the insurer.

In one aspect, a transportation analytics (TA) computing device may be provided. The TA computing device may include at least one processor and/or associated transceiver in communication with at least one memory device. The at least one processor and/or associated transceiver may be configured to: (1) receive, from a user mobile device corresponding to a user, telematics data corresponding to a trip taken using a transportation platform; (2) store, for each trip, the telematics data in a database in association with a trip identifier and a timestamp; (3) perform a lookup in the database to identify, based upon the timestamps, telematics data corresponding to a time period; (4) calculate, in response to identifying the telematics data, based upon the identified telematics data, a premium amount; and/or (5) transfer, in response to calculating the premium amount, the premium amount from a transportation platform account associated with the transportation platform to an insurer account associated with an insurer. The TA computing device may include additional, less, or alternate functionality, including that discussed elsewhere herein.

In another aspect, a computer-implemented method for transportation analytics may be provided. The computer-implemented method may be performed by a transportation analytics (TA) computing device including at least one processor and/or associated transceiver in communication with at least one memory device. The computer-implemented method may include (1) receiving, by the TA computing device, from a user mobile device corresponding to a user, telematics data corresponding to a trip taken using a transportation platform; (2) storing, by the TA computing device, for each trip, the telematics data in a database in association with a trip identifier and a timestamp; (3) performing, by the TA computing device, a lookup in the database to identify, based upon the timestamps, telematics data corresponding to a time period; (4) calculating, by the TA computing device, in response to identifying the telematics data, based upon the identified telematics data, a premium amount; and/or (5) transferring, by the TA computing device, in response to calculating the premium amount, the premium amount from a transportation platform account associated with the transportation platform to an insurer account associated with an insurer. The computer-implemented method may include additional, less, or alternate actions, including those discussed elsewhere herein.

In another aspect, at least one non-transitory computer-readable media having computer-executable instructions embodied thereon may be provided. When executed by a transportation analytics (TA) computing device including at least one processor and/or associated transceiver in communication with at least one memory device, the computer-executable instructions may cause the at least one processor and/or associated transceiver to (1) receive, from a user mobile device corresponding to a user, telematics data corresponding to a trip taken using a transportation platform;

(2) store, for each trip, the telematics data in a database in association with a trip identifier and a timestamp; (3) perform a lookup in the database to identify, based upon the timestamps, telematics data corresponding to a time period; (4) calculate, in response to identifying the telematics data, based upon the identified telematics data, a premium amount; and/or (5) transfer, in response to calculating the premium amount, the premium amount from a transportation platform account associated with the transportation platform to an insurer account associated with an insurer. The computer-executable instructions may direct additional, less, or alternate functionality, including that discussed elsewhere herein.

In another aspect, a transportation analytics (TA) computing device may be provided. The TA computing device may include at least one processor and/or associated transceiver in communication with at least one memory device and a user mobile device corresponding to a user. The at least one processor and/or associated transceiver may be configured to: (1) receive, from the user mobile device, telematics data including an indicator that the user mobile device is communicatively linked to a transportation device; (2) identify each period that the user mobile device is communicatively linked to the transportation device as a trip using the transportation device; (3) store, the telematics data in a database in association with a trip identifier corresponding to the identified trips and a time stamp; (4) perform a lookup in the database to identify, based upon the timestamps, telematics data corresponding to a time period; and/or (5) calculate, based upon the identified telematics data, a premium amount for insuring the user during the trips taken using the transportation device during the time period. The TA computing device may include additional, less, or alternate functionality, including that discussed elsewhere herein.

In another aspect, a computer-implemented method for transportation analytics may be provided. The computer-implemented method may be performed by a transportation analytics (TA) computing device including at least one processor and/or associated transceiver in communication with at least one memory device and a user mobile device corresponding to a user. The computer-implemented method may include (1) receiving, by the TA computing device, from the user mobile device, telematics data including an indicator that the user mobile device is communicatively linked to a transportation device; (2) identifying, by the TA computing device, each period that the user mobile device is communicatively linked to the transportation device as a trip using the transportation device; (3) storing, by the TA computing device, the telematics data in a database in association with a trip identifier corresponding to the identified trips and a time stamp; (4) performing, by the TA computing device, a lookup in the database to identify, based upon the timestamps, telematics data corresponding to a time period; and/or (5) calculating, by the TA computing device, based upon the identified telematics data, a premium amount for insuring the user during the trips taken using the transportation device during the time period. The computer-implemented method may include additional, less, or alternate actions, including those discussed elsewhere herein.

In another aspect, at least one non-transitory computer-readable media having computer-executable instructions embodied thereon may be provided. When executed by a transportation analytics (TA) computing device including at least one processor and/or associated transceiver in communication with at least one memory device and a user mobile device corresponding to a user, the computer-executable instructions may cause the at least one processor and/or associated transceiver to (1) receive, from the user mobile device, telematics data including an indicator that the user mobile device is communicatively linked to a transportation device; (2) identify each period that the user mobile device is communicatively linked to the transportation device as a trip using the transportation device; (3) store the telematics data in a database in association with a trip identifier corresponding to the identified trips and a time stamp; (4) perform a lookup in the database to identify, based upon the timestamps, telematics data corresponding to a time period; and/or (5) calculate, based upon the identified telematics data, a premium amount for insuring the user during the trips taken using the transportation device during the time period. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
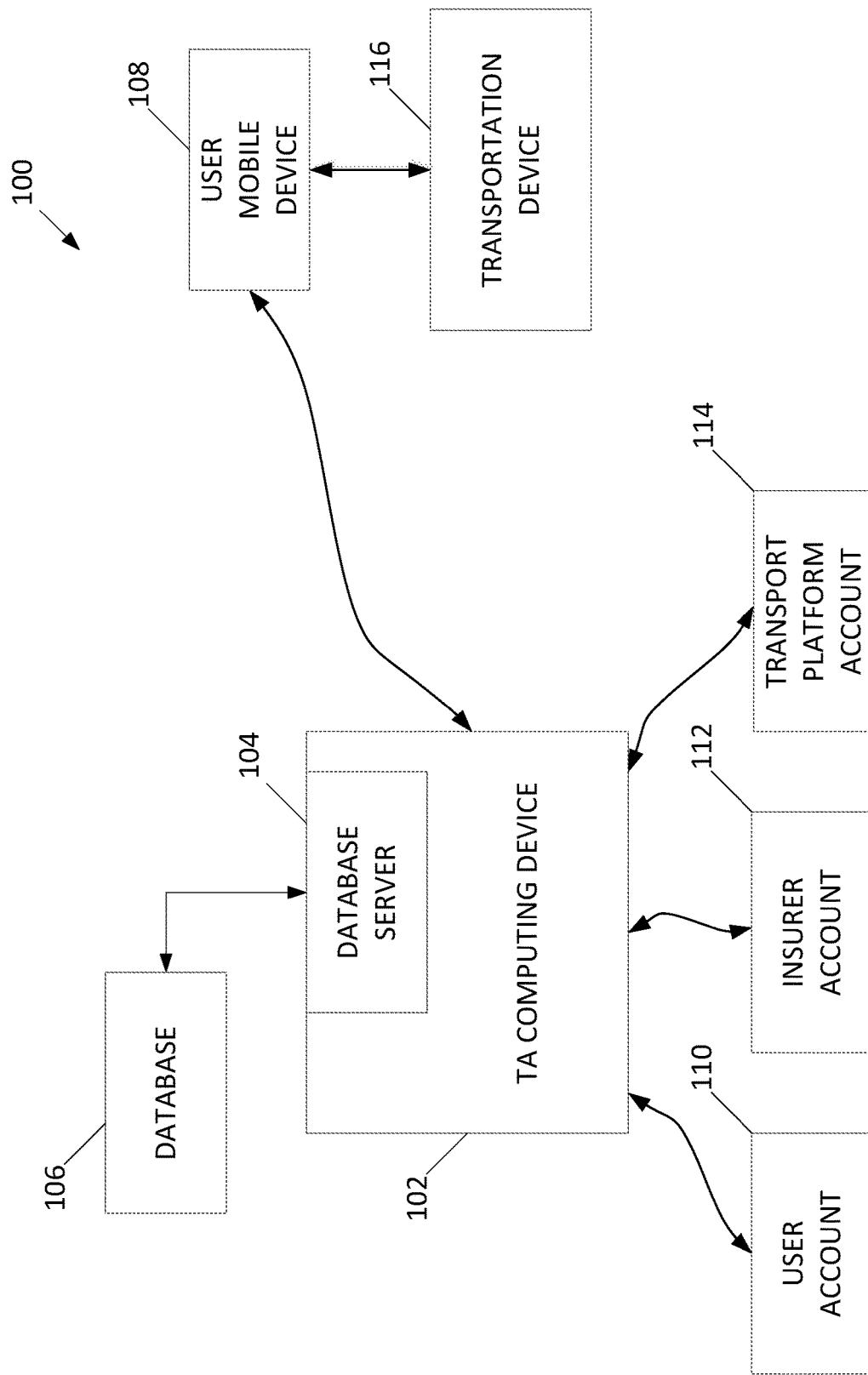
FIG. 1 depicts an exemplary transportation analytics (TA) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating transportation analytics using a mobility device embedded within a vehicle. In exemplary embodiments, the systems and methods may be performed by a transportation analytics ("TA") computing device. The TA computing device may collect and analyze telematics data (e.g., acceleration, cornering, braking, position, velocity, orientation, speed, location, GPS location or other GPS information, etc.) gathered by a mobile device carried by a user a user during a trip of the user (sometimes referred to herein as a "user mobile device"). The TA computing device may identify trips based upon the telematics data and use the telematics data to analyze the transportation behavior of the user, for example, to calculate an insurance premium. An insurer and/or transportation platform may provide an insurance subscription to the user that may have a premium that is calculated based upon use of the transportation platform.

In some example embodiments, the TA computing device may analyze telematics data corresponding to rides taken by the user using a transportation platform (e.g., a rideshare, bicycle share, and/or other transportation platform). In such embodiments, the TA computing device may be configured to calculate a premium for an insurance policy based upon the telematics data corresponding to such rides. The TA computing device may be further configured to automatically transfer the calculated premium to an insurer providing the insurance policy, for example, for the user and/or from the transportation platform (e.g., wherein the user pays a periodic insurance subscription fee to the transportation platform).

In some example embodiments, the TA computing device may analyze telematics data corresponding to rides taken using a transportation device (e.g., a motor vehicle, bicycle, and/or powered scooter) that is capable of being communicatively linked to the user mobile device. In such embodiments, the TA computing device may receive, from the user mobile device, telematics data including an indicator that the user mobile device is communicatively linked to the transportation device (e.g., via a physical and/or wireless connection). Such telematics data may be used by the TA computing device to calculate a premium for an insurance policy based upon actual use of the transportation device. For example, the insurance policy may cover the transportation device itself and/or may be a personal mobility policy (PMP), which covers various different modes of transportation utilized by the user (e.g., the transportation device, vehicles, rideshare trips, mass transit, and/or other modes of transportation). In such embodiments, the TA computing device may automatically transfer the calculated premium from the user to the insurer providing the policy in response to calculating the premium.

Receiving Telematics Data from User Mobile Devices

In one exemplary embodiment, the TA computing device may be configured to receive telematics data from the user mobile device. Telematics data may include, for example, data describing movement of the user mobile device (e.g., a geolocation, an acceleration, cornering information, braking information, a speed, a position, and/or an orientation) and/or other data describing a status of the device (e.g., whether the user mobile device is being used for a rideshare platform and/or whether the device is communicatively linked and/or docked to a transportation device).

The user mobile device may be equipped with components capable of generating telematics data (e.g., an accelerometer, a global positioning system (GPS) receiver, a gyroscope, and/or other sensors). In some embodiments, the user mobile device may obtain telematics data from other devices that are communicatively coupled to the user mobile device (e.g., via a wired or wireless connection). For example, the mobile device may be communicatively coupled to a vehicle, another transportation device (e.g., a powered scooter), and/or a telematics device equipped with sensors capable of generating telematics data.

The user mobile device may transmit telematics data to the TA computing device, for example, via a computer network connection (e.g., a cellular network and/or wireless local area network (WLAN) connection). In some embodiments, the user mobile device may continuously transmit telematics data to the TA computing device (e.g., as a data stream). Additionally or alternatively, the user mobile device may store collected telematics data locally (e.g., in a memory of the user mobile device), and periodically transmit telematics data to the TA computing device in bulk.

In some embodiments, the user mobile device may collect, store, and or transmit telematics data by executing a mobile application ("app") installed on the user mobile device. In some such embodiments, the mobile app may be associated with, for example, a transportation platform (e.g., a rideshare platform and/or transportation network company (TNC)) and/or an insurer. In such embodiments, the TA computing device may generate and display, at the user mobile device, a user interface via the mobile app. As described below, the user interface may provide further functionality, such as enabling the user to purchase insurance and/or adjust an insurance coverage amount.

Identifying Trips Based Upon Telematics Data

In one exemplary embodiment, the TA computing device is configured to identify trips taken by the user based upon telematics data and store telematics data corresponding to each trip, for example, in a database. By identifying telematics data that corresponds to trips taken by the user, the TA computing device may analyze the user's transportation behavior based upon the telematics data received from the user mobile device.

In some embodiments, the TA computing device may identify trips that were taken by the user via a transportation platform (e.g., a rideshare and/or bike share platform). In such embodiments, the TA computing device may receive, from the user mobile device, data about trips taken using such transportation platforms (e.g., an origin, destination, distance, duration, speed, acceleration, braking, cornering, and/or other telematics data captured during the trip). Additionally or alternatively, such data may be stored at a computing device and/or server associated with the transportation platform, and the TA computing device may retrieve such data from a computing device associated with the transportation platform.

In some embodiments, the TA computing device may identify trips based upon data received from the user mobile device indicating that the user mobile device is communicatively linked to a transportation device. For example, some transportation devices (e.g., a motor vehicle, bicycle and/or powered scooter) may enable the user mobile device to be communicatively coupled to the transportation device, for example, through a physical dock and/or a wireless connection (e.g., a Bluetooth and/or Wi-Fi connection). In such embodiments, the TA computing device may identify a duration of time when the user mobile device is communicatively linked to the transportation device as a trip. The TA computing device may further rely on additional telematics data to make such a determination, such as telematics data indicating that the user traveled between a plurality of locations during the identified trip.

In some embodiments, the TA computing device may build a database using the received telematics data and identified trips. For example, the TA computing device may generate a trip identifier (e.g., a number or alphanumeric code) for each identified trip and store the trip identifier in the database. The TA computing device may further store telematics data corresponding to each trip identifier in the database in association with the trip identifier. In some embodiments, the TA computing device may store additional data in association with each trip identifier, such as a timestamp corresponding to each trip (e.g., an initiation or completion time of each trip).

Analyzing & Calculating Premiums Based on Telematics Data

In one exemplary embodiment, the TA computing device may be configured to analyze the telematics data, for example, to calculate a premium for an insurance policy associated with the user. The TA computing device may perform a lookup in the database to identify each trip relevant to the insurance policy, for example, trips occurring within a period of the policy and/or having a particular transportation type covered by the insurance policy. The TA computing device may retrieve telematics data associated with the identified trips and analyze the telematics data to calculate the premium. For example, some telematics data (e.g., distance and/or time traveled, driving style, routes taken, acceleration, braking, cornering, etc.) may be correlated with an amount of risk, or lack thereof, associated with the transportation behavior of the user. The TA computing device may therefore calculate an insurance premium that corresponds to the amount of risk, or lack thereof, of the actual transportation behavior of the user. In some embodiments, the TA computing device may utilize artificial intelligence (AI) and/or machine learning techniques to calculate the premium based upon telematics data.

In some embodiments, the TA computing device may calculate an insurance premium for users of a transportation platform (e.g., a rideshare, bicycle share, and or scooter share platform). In such embodiments, the user may subscribe to an insurance policy, wherein the premium is paid periodically (e.g., monthly). For example, the user may subscribe to the insurance policy via the mobile app (e.g., in connection with the transportation platform).

In some embodiments, the user may pay the calculated premium directly to the insurer. In such embodiments, the TA computing device may, in response to calculating the premium, automatically transfer the calculated premium from an account associated with the user (e.g., a deposit account and/or payment card account) to an account associated with the insurer.

Additionally or alternatively, an entity associated with the transportation platform may pay the insurer the calculated premium, and the user may in turn pay the transportation platform entity, for example, a fixed monthly fee and/or a variable monthly fee that depends on the calculated premium. In such embodiments, the TA computing device may automatically transfer the calculated premium from an account associated with the transportation platform entity to an account associated with the insurer, and/or transfer a fee from an account associated with the user to an account associated with the transportation platform entity.

In some embodiments, the TA computing device may calculate an insurance premium for a transportation device (e.g., a motor vehicle, bicycle, powered scooter, and/or other transportation device) based upon telematics data corresponding to use of the transportation device. For example, as described above, the transportation device may be communicatively linked to the user mobile device such that the TA computing device may obtain, from the user mobile device, telematics data associated with trips made using the transportation device. The TA computing device may use such telematics data to calculate a premium for an insurance policy associated with the transportation device based upon actual use of the transportation device. In some embodiments, the insurance policy may be, for example, a personal mobility policy (PMP) that covers a plurality of different modes of transportation of the user (e.g., the transportation device, vehicles, rideshare trips, mass transit, and/or other modes of transportation). In some embodiments, the TA computing device may, in response to calculating the insurance premium associated with the transportation device, automatically transfer the premium amount from an account associated with the user to an account associated with the insurer providing the policy.

At least one of the technical problems addressed by this system may include: (i) inability for a computing device to calculate an insurance premium based upon telematics data originating from a user mobile device due to a lack of a specific data structure; (ii) inability for a computing device to calculate an insurance premium based upon a user's actual transportation behavior; (iii) inability for a computing device to calculate an insurance premium based upon a user's usage of a transportation platform; (iv) inability for a computing device to calculate an insurance premium based upon use of a transportation device that may be communicatively linked to a user mobile device; (v) inefficiency in a payment process for usage-based insurance (UBI) having a premium that may vary from period to period; and/or (vi) inefficiency in a payment process for a usage-based insurance (UBI) policy wherein multiple parties may have payment obligations.

A technical effect of the systems and processes described herein may be achieved by performing at least one of the following steps: (i) receiving, from a user mobile device corresponding to a user, telematics data corresponding to a trip taken using a transportation platform; (ii) storing, for each trip, the telematics data in a database in association with a trip identifier and a timestamp; (iii) performing a lookup in the database to identify, based upon the timestamps, telematics data corresponding to a time period; (iv) calculating, in response to identifying the telematics data, based upon the identified telematics data, a premium amount; (v) transferring, in response to calculating the premium amount, the premium amount from a transportation platform account associated with the transportation platform to an insurer account associated with an insurer; (vi) receiving, from the user mobile device, telematics data including an indicator that the user mobile device is communicatively linked to the transportation device; (vii) identifying each period that the user mobile device is communicatively linked to the transportation device as a trip using the transportation device; (viii) storing, the telematics data in a database in association with a trip identifier corresponding to the identified trips and a time stamp; (ix) performing a lookup in the database to identify, based upon the timestamps, telematics data corresponding to a time period; and/or (x) calculating, based upon the identified telematics data, a premium amount.

The technical effect achieved by this system may be at least one of: (i) ability for a computing device to calculate an insurance premium based upon telematics data originating from a user mobile device by providing a specific data structure; (ii) ability for a computing device to calculate an insurance premium based upon a user's actual transportation behavior; (iii) ability for a computing device to calculate an insurance premium based upon a user's usage of a transportation platform; (iv) ability for a computing device to calculate an insurance premium based upon use of a transportation device that may be communicatively linked to a user mobile device; (v) improved efficiency for a payment process for usage-based insurance (UBI) having a premium that may vary from period to period; and/or (vi) improved efficiency for a payment process for a usage-based insurance (UBI) policy wherein multiple parties may have payment obligations.

Exemplary Transportation Analytics System

FIG. 1 depicts an exemplary transportation analytics (TA) system 100. TA system 100 may include a TA computing device 102 including a database server 104. TA computing device 102 may be in communication with a database 106 and/or one or more user mobile devices 108 associated with one or more users. TA computing device 102 may be capable of transferring funds between a user account 110, an insurer account 112, and/or a transportation platform account 114, which may be associated with the user, an insurer, and/or a transportation platform (e.g., a TNC), respectively. User mobile device 108 may be configured to be communicatively linked (e.g., communicatively coupled to) a transportation device 116 (e.g., a motor vehicle, bicycle, and/or powered scooter). For example, user mobile device 108 may be physically coupled to transportation device 116 and/or wirelessly coupled to transportation device 116 (e.g., via a Bluetooth and/or WLAN connection).

In one exemplary embodiment, TA computing device 102 may be configured to receive telematics data from user mobile device 108. Telematics data may include, for example, data describing movement of user mobile device 108 (e.g., a geolocation, an acceleration, a speed, a position, braking information, cornering information, route information, origination and destination information, location information, and/or an orientation) and/or other data describing a status of the device (e.g., whether user mobile device 108 is being used for a rideshare platform and/or whether the device is communicatively linked and/or docked to a transportation device). User mobile device 108 may be equipped with components capable of generating telematics data (e.g., an accelerometer, a global positioning system (GPS) receiver, a gyroscope, and/or other sensors).

In some embodiments, user mobile device 108 may obtain telematics data from other devices that are communicatively coupled to the user mobile device (e.g., via a wired or wireless connection). For example, user mobile device 108 may be communicatively coupled to transportation device 116 and/or a telematics device equipped with sensors capable of generating telematics data. User mobile device 108 may transmit telematics data to TA computing device 102, for example, via a computer network connection (e.g., a cellular network and/or wireless local area network (WLAN) connection). Additionally or alternatively, user mobile device 108 may be communicatively coupled to one or more vehicle-mounted sensors, processors, and/or transceivers, and/or transportation device-mounted sensors, processors, and/or transceivers.

In some embodiments, user mobile device 108 may continuously transmit telematics data to TA computing device 102 (e.g., as a data stream). Additionally or alternatively, user mobile device 108 may store collected telematics data locally (e.g., in a memory of user mobile device 108), and periodically transmit telematics data to TA computing device 102 in bulk.

In some embodiments, user mobile device 108 may collect, store, and or transmit telematics data by executing a mobile application ("app") installed on user mobile device 108. In some such embodiments, the mobile app may be associated with, for example, a transportation platform (e.g., a rideshare platform and/or transportation network company (TNC)) and/or an insurer. In such embodiments, TA computing device 102 may generate and display, at user mobile device 108, a user interface via the mobile app. As described below, the user interface may provide further functionality, such as enabling the user to purchase insurance and/or adjust an insurance coverage amount.

In one exemplary embodiment, TA computing device 102 may be configured to identify trips taken by the user based upon telematics data and store telematics data corresponding to each trip, for example, in database 106. By identifying telematics data that corresponds to trips taken by the user, TA computing device 102 may analyze the user's transportation behavior based upon the telematics data received from user mobile device 108.

In some embodiments, TA computing device 102 may identify trips that were taken by the user via a transportation platform (e.g., a rideshare and/or bike share platform). In such embodiments, the TA computing device may receive, from user mobile device 108, data from trips taken using such transportation platforms (e.g., an origin, destination, distance, duration, and/or other telematics data captured during the trip). Additionally or alternatively, such data may be stored at a computing device and/or server associated with the transportation platform, and TA computing device 102 may retrieve such data from a computing device associated with the transportation platform.

In some embodiments, TA computing device 102 may identify trips based upon data received from user mobile device 108 indicating that the user mobile device is communicatively linked to transportation device 116. For example, some transportation devices 116 (e.g., a motor vehicle, bicycle and/or powered scooter) may enable user mobile device 108 to be communicatively coupled to transportation device 116, for example, through a physical dock and/or a wireless connection (e.g., a Bluetooth and/or WLAN connection). In such embodiments, TA computing device 102 may identify a duration of time when the user mobile device is communicatively linked to the transportation device as a trip. TA computing device 102 may further rely on additional telematics data to make such a determination, such as telematics data indicating that the user traveled between a plurality of locations during the identified trip.

In some embodiments, TA computing device 102 may build database 106 using the received telematics data and identified trips. For example, TA computing device 102 may generate a trip identifier (e.g., a number or alphanumeric code) for each identified trip and store the trip identifier in database 106. TA computing device 102 may further store telematics data corresponding to each trip identifier in database 106 in association with the trip identifier. In some embodiments, TA computing device 102 may store additional data in association with each trip identifier, such as a timestamp corresponding to each trip (e.g., an initiation or completion time of each trip).

In one exemplary embodiment, TA computing device 102 may be configured to analyze the telematics data, for example, to calculate a premium for an insurance policy associated with the user. TA computing device 102 may perform a lookup in database 106 to identify each trip relevant to the insurance policy, for example, trips occurring within a period of the policy and/or having a particular transportation type covered by the insurance policy.

TA computing device 102 may retrieve telematics data associated with the identified trips and analyze the telematics data to calculate the premium. For example, some telematics data (e.g., distance and/or time traveled, driving style, routes taken, etc.) may be correlated with an amount of risk associated with the transportation behavior of the user. TA computing device 102 may therefore calculate an insurance premium that corresponds to the amount of risk of the actual transportation behavior of the user, or lack thereof. In some embodiments, TA computing device 102 may utilize artificial intelligence (AI) and/or machine learning techniques to calculate the premium based upon telematics data.

In some embodiments, TA computing device 102 may calculate an insurance premium for users of a transportation platform (e.g., a rideshare and/or bike share platform). In such embodiments, the user may subscribe to an insurance policy, wherein the premium is paid periodically (e.g., monthly). For example, the user may subscribe to the insurance policy via the mobile app (e.g., in connection with the transportation platform).

In some embodiments, the user may pay the calculated premium directly to the insurer. In such embodiments, TA computing device 102 may, in response to calculating the premium, automatically transfer the calculated premium from user account 110 (e.g., a deposit account and/or payment card account) to insurer account 112.

Additionally or alternatively, an entity associated with the transportation platform may pay the insurer the calculated premium, and the user may in turn pay the transportation platform entity, for example, a fixed monthly fee and/or a variable monthly fee that depends on the calculated premium. In such embodiments, TA computing device 102 may automatically transfer the calculated premium from transportation platform account 114 to insurer account 112, and/or transfer a fee from user account 110 to transportation platform account 114.

In some embodiments, TA computing device 102 may calculate an insurance premium for transportation device 116 (e.g., a motor vehicle, bicycle, powered scooter, and/or other transportation device) based upon telematics data corresponding to use of transportation device 116. For example, as described above, transportation device 116 may be communicatively linked to user mobile device 108 such that TA computing device 102 may obtain, from user mobile device 108, telematics data associated with trips that were taken using transportation device 116. TA computing device 102 may use such telematics data to calculate a premium for an insurance policy associated with transportation device 102 based upon actual use of the transportation device. In some embodiments, the insurance policy may be, for example, a personal mobility policy (PMP) that covers a plurality of different modes of transportation of the user (e.g., transportation device 116, vehicles, rideshare trips, mass transit, and/or other modes of transportation). In some embodiments, TA computing device 102 may, in response to calculating the insurance premium associated with the transportation device, automatically transfer the premium amount from user account 110 to insurer account 112.

Exemplary Client Computing Device

Figure 2:
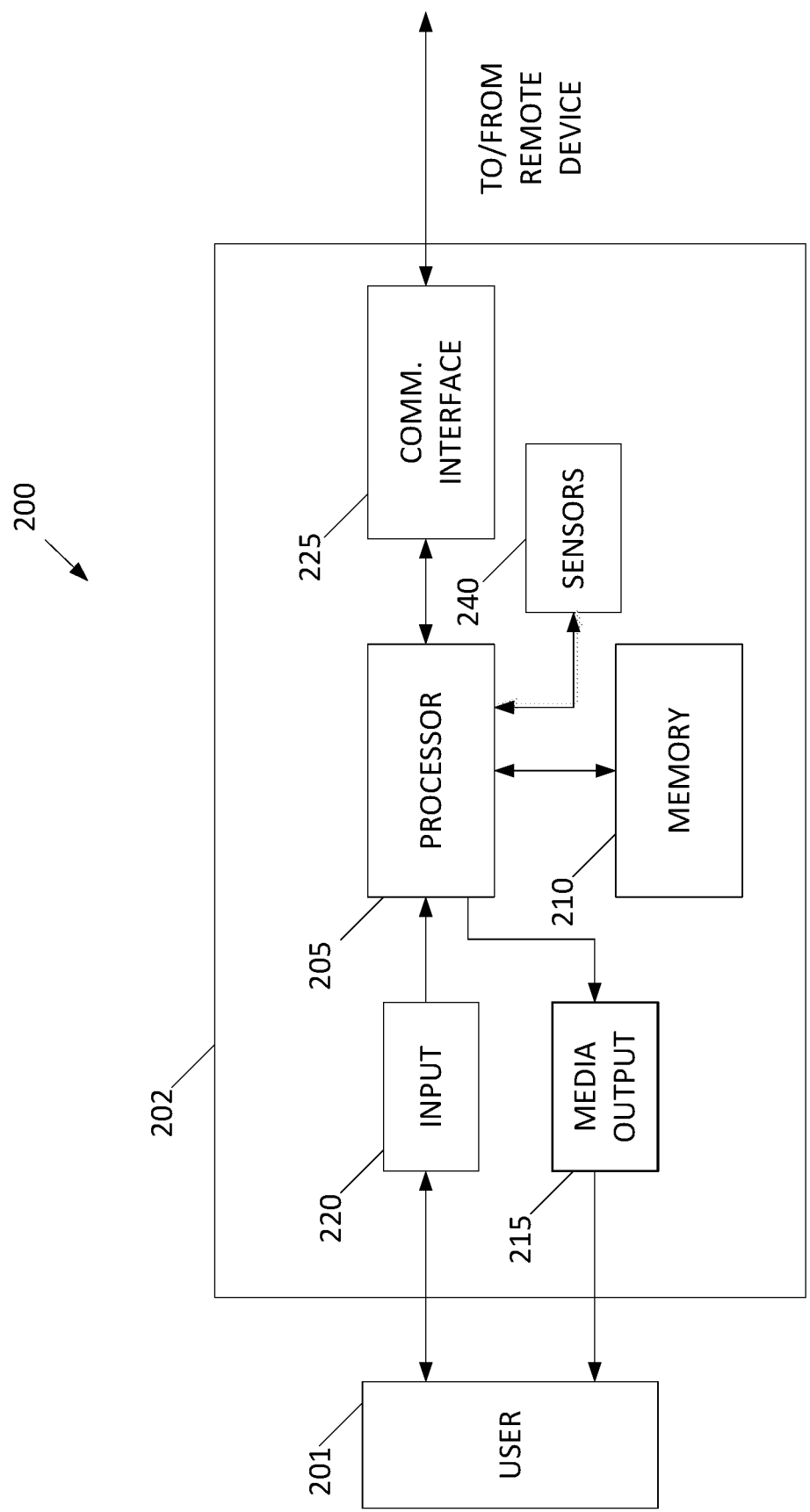
FIG. 2 depicts an exemplary client computing device that may be used with the TA system illustrated in FIG. 1.

FIG. 2 depicts an exemplary client computing device 202. Client computing device 202 may be, for example, at least one of TA computing device 102, user mobile device 108, and/or transportation device 116 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In certain exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as TA computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some embodiments, client computing device 202 may also include sensors 240. Sensors 240 may include, for example, an accelerometer, a global positioning system (GPS), or a gyroscope. Sensors 240 may be used to collect telematics data, which may be transmitted by client computing device 202 a remote device such as TA computing device 102 (shown in FIG. 1).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from TA computing device 102 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
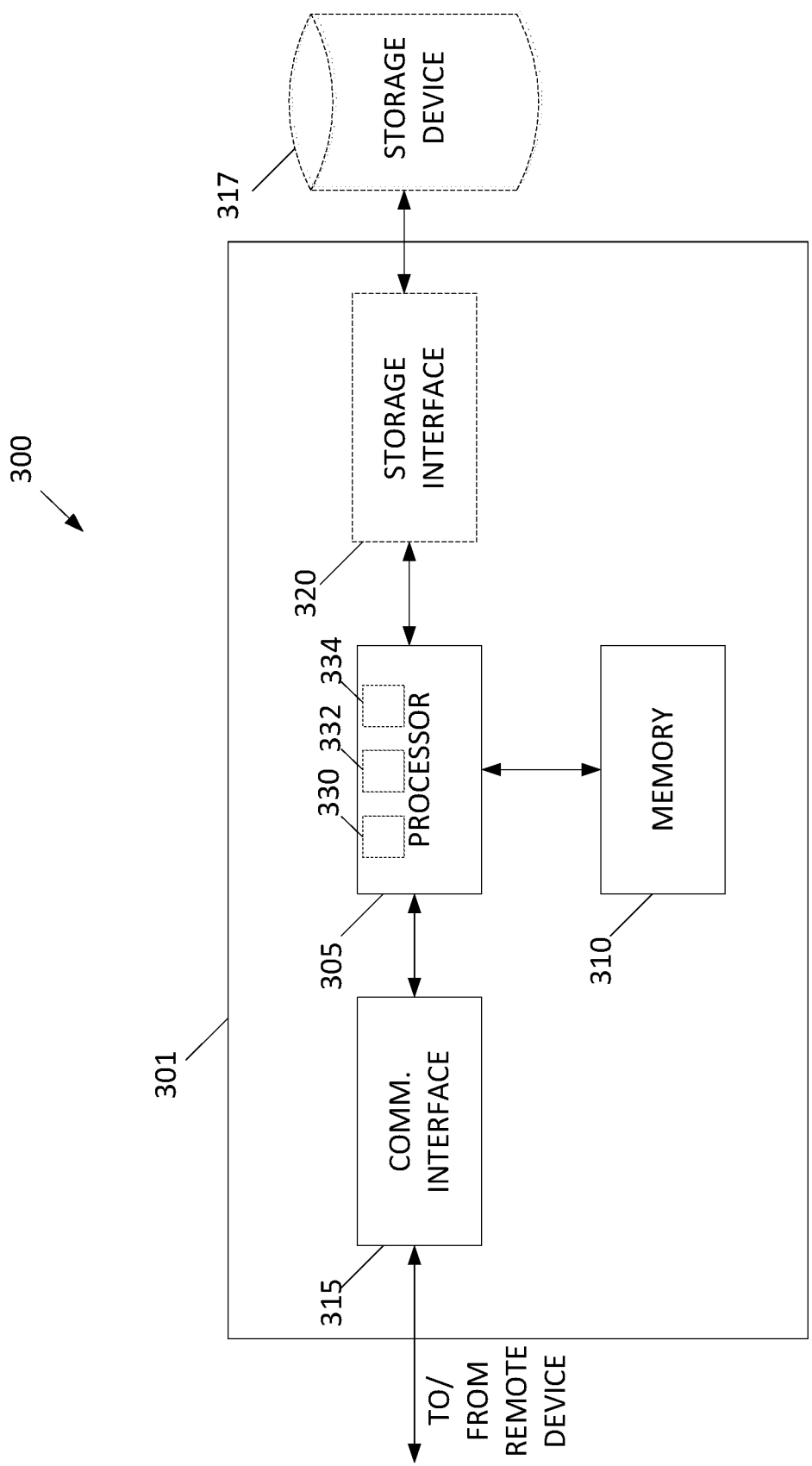
FIG. 3 depicts an exemplary server system that may be used with the TA system illustrated in FIG. 1.

FIG. 3 depicts an exemplary server system that may be used with TA system 100 illustrated in FIG. 1. Server system 301 may be, for example, TA computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with user mobile device 108 and/or transportation device 116 (all shown in FIG. 1), or another server system 301. For example, communication interface 315 may receive requests from user mobile device 108 via the Internet. Further, processor 305, via communication interface 315, may be capable of causing funds to be transferred between various entities, such as, for example, user account 110, insurer account 112, and/or transportation platform account 114 (all shown in FIG. 1).

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In exemplary embodiments, processor 305 may include and/or be communicatively coupled to one or more modules for implementing the systems and methods described herein. In some embodiments, processor 305 may include a communication module 330, which may be configured to, for example, receive, from a user mobile device (e.g., user mobile device 108) corresponding to a user, telematics data corresponding to a trip taken using a transportation platform; generate, at the user mobile device, a user interface including at least one of a plurality of coverage types and a plurality of coverage amounts; display, at the user mobile device, the user interface; and/or receive, from the user via the user interface, a user input including a selection of at least one of a coverage type of the plurality of coverage types or a coverage amount from the plurality of coverage amounts.

In some embodiments, processor may further include a data management module 332, which may be configured to, for example, store, for each trip, the telematics data in a database (e.g., database 106) in association with a trip identifier and a timestamp and/or perform a lookup in the database to identify, based upon the timestamps, telematics data corresponding to a time period.

In some embodiments, processor 305 may further include an analytics module 334, which may be configured to, for example, calculate, in response to identifying the telematics data, based upon the identified telematics data, a premium amount; calculate the subscription amount based upon at least one of the premium amount or the identified telematics data; calculate the premium amount further based upon the user input; and/or identify each period that the user mobile device is communicatively linked to the transportation device as a trip using the transportation device.

In some embodiments, processor 305 may further include a funds transfer module 336, which may be configured to, for example, transfer, in response to calculating the premium amount, the premium amount from a transportation platform account (e.g., transportation platform account 114) associated with the transportation platform to an insurer account (e.g., insurer account 112) associated with an insurer; transfer, in response to calculating the premium amount, a subscription amount from a user account (e.g., user account 110) associated with the user to the transportation platform account; and/or transfer, in response to computing the premium amount, the premium amount from a user account associated with the user to an insurer account associated with an insurer.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Transportation Device

Figure 4:
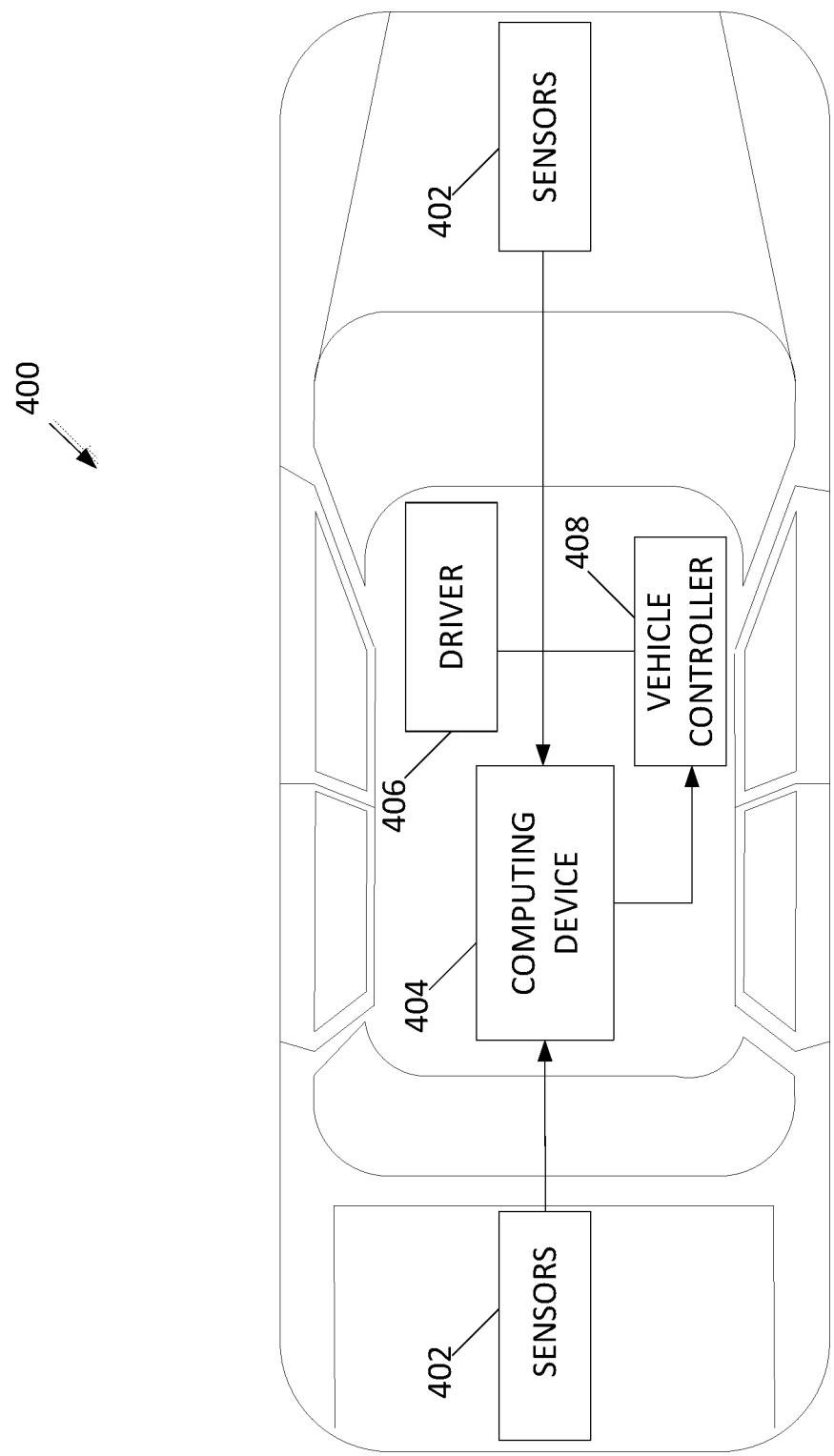
FIG. 4 depicts an exemplary connected vehicle that may be used with the TA system illustrated in FIG. 1.

FIG. 4 depicts an exemplary transportation device 400. Transportation device 400 may be, for example, transportation device 116. In some embodiments, transportation device 400 may be a conventional and/or autonomous automobile, a motorcycle, a bicycle, a powered scooter (e.g., an electric scooter), and/or another vehicle.

Transportation device 400 may include a plurality of sensors 402 and a computing device 404. Sensors 402 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. In some embodiments, sensors 402 may be used to collect, for example, vehicle telematics data, as described above. In addition, sensors 402 may be used to collect additional information, for example, whether any external devices (e.g., user mobile device 108) are communicatively linked to and/or otherwise in proximity to transportation device 400.

Such telematics data and/or sensor data collected by sensors 402 may be transmitted to TA computing device 102 (shown in FIG. 1). The telematics data may be transmitted, for example, via user mobile device 108 (shown in FIG. 1), which may be communicatively linked to transportation device 400 (e.g., via a physical dock and/or a wireless connection).

Computing device 404 may be implemented, for example, as client computing device 202 (shown in FIG. 2). In exemplary embodiments, computing device 404 may receive data from sensors 402. In certain embodiments where TA computing device 102 is remote from transportation device 400, computing device 404 may transmit data received from sensors 402 (e.g., vehicle telematics data) to TA computing device 102. Alternatively, TA computing device 102 may be implemented as computing device 404.

In exemplary embodiments, vehicle controller 408 may control at least some operation of transportation device 400. For example, vehicle controller 408 may steer, accelerate, or decelerate transportation device 400 based upon data received, for example, from sensors 402. In some embodiments, vehicle controller 408 may include a display screen or touchscreen (not shown) that is capable of displaying information to and/or receiving input from driver 406.

In other embodiments, vehicle controller 408 may be capable of wirelessly communicating with a user mobile device such as user mobile device 108 in connected car 400. In these embodiments, vehicle controller 408 may be capable of communicating with the user of user mobile device 108, such as driver 406, through an application on user mobile device 108. In some embodiments, computing device 404 may include vehicle controller 408.

Exemplary Method for Determining an Insurance Premium Using the TA System

Figure 5:
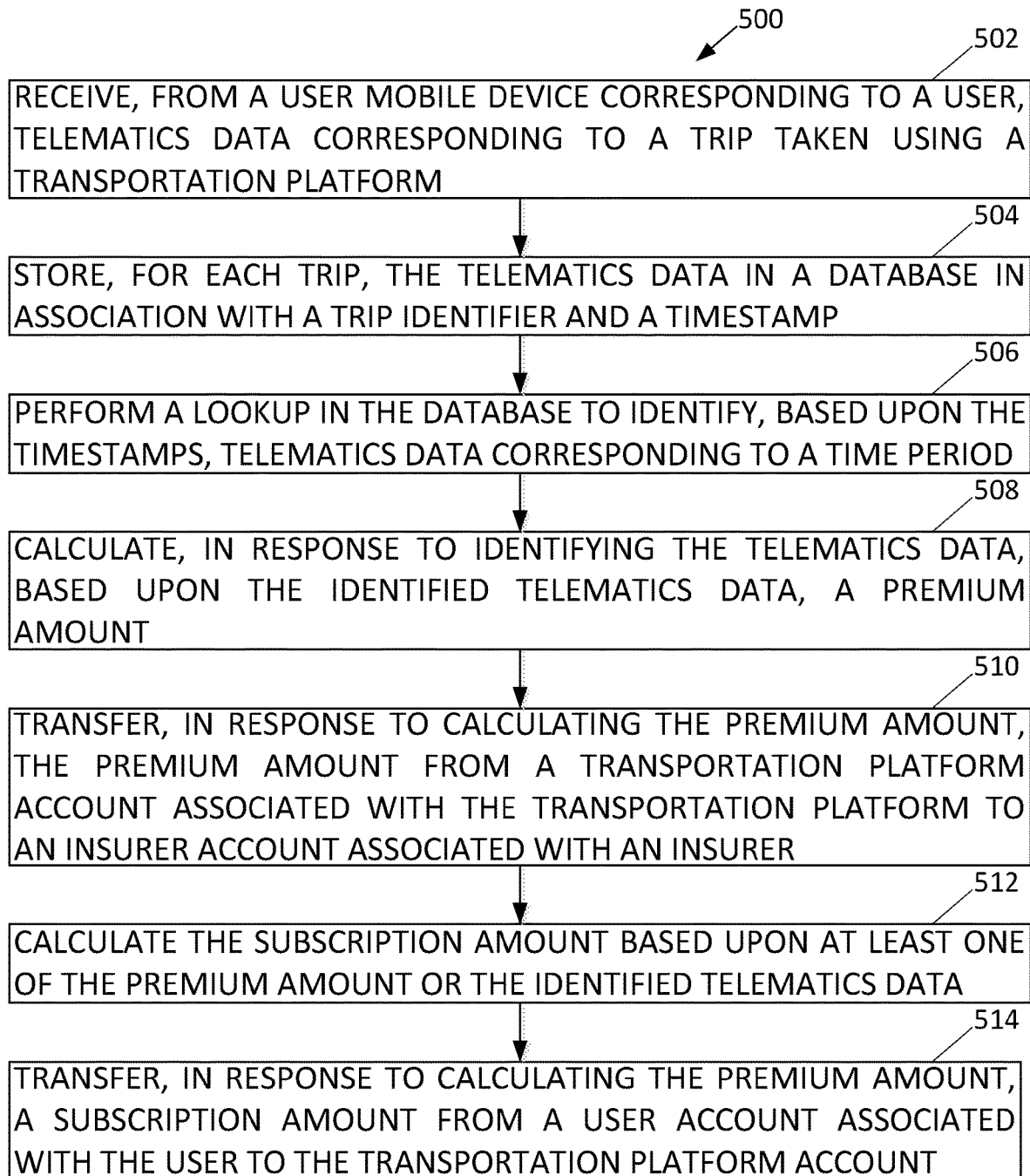
FIG. 5 illustrates an exemplary computer-implemented method for determining an insurance premium that may be performed by the TA system illustrated in FIG. 1.

FIG. 5 illustrates an exemplary computer-implemented method 500 for determining an insurance premium that may be may be implemented using one or more components of TA system 100 (shown in FIG. 1).

Computer-implemented method 500 may include receiving 502, from a user mobile device corresponding to a user, telematics data corresponding to a trip taken using a transportation platform. In some embodiments, receiving 502 the telematics data may be performed by TA computing device 102 (shown in FIG. 1), for example, by executing communication module 330 (shown in FIG. 3). In some embodiments, the transportation platform may correspond to a transportation network company (TNC). In such embodiments, at least some of the trips correspond to rides taken using the TNC.

Additionally or alternatively, in some embodiments, the user mobile device may be communicatively linked to a transportation device. In such embodiments, at least some of the trips may correspond to rides taken by the user using the transportation device. Further, in such embodiments, the transportation device may be at least one of a motor vehicle, a bicycle, and/or an electric scooter.

Computer-implemented method 500 may further include storing 504, for each trip, the telematics data in a database in association with a trip identifier and a timestamp. In some embodiments, storing 504 the telematics data may be performed by TA computing device 102, for example, by executing data management module 332 (shown in FIG. 3).

Computer-implemented method 500 may further include performing 506 a lookup in the database to identify, based upon the timestamps, telematics data corresponding to a time period. In some embodiments, performing 506 the lookup may be performed by TA computing device 102, for example, by executing data management module 332.

Computer-implemented method 500 may further include calculating 508, in response to identifying the telematics data, based upon the identified telematics data, a premium amount. In some embodiments, calculating the premium amount may be performed by TA computing device 102, for example, by executing analytics module 334 (shown in FIG. 3).

Computer-implemented method 500 may further include transferring 510, in response to calculating the premium amount, the premium amount from a transportation platform account associated with the transportation platform to an insurer account associated with an insurer. In some embodiments, transferring 510 the premium amount may be performed by TA computing device 102, for example, by executing funds transfer module 336 (shown in FIG. 3).

In some embodiments, computer-implemented method may further include calculating 512, a subscription amount based upon at least one of the premium amount or the identified telematics data. In some such embodiments, calculating 512 the subscription amount may be performed by TA computing device 102, for example, by executing analytics device 334.

In some embodiments, computer-implemented method 500 may further include transferring 514, in response to calculating the premium amount, a subscription amount from a user account associated with the user to the transportation platform account. In some such embodiments, transferring 514 the subscription amount may be performed by TA computing device 102, for example, by executing funds transfer module 336.

Exemplary Method for Providing a User Interface for Transportation Analytics

Figure 6:
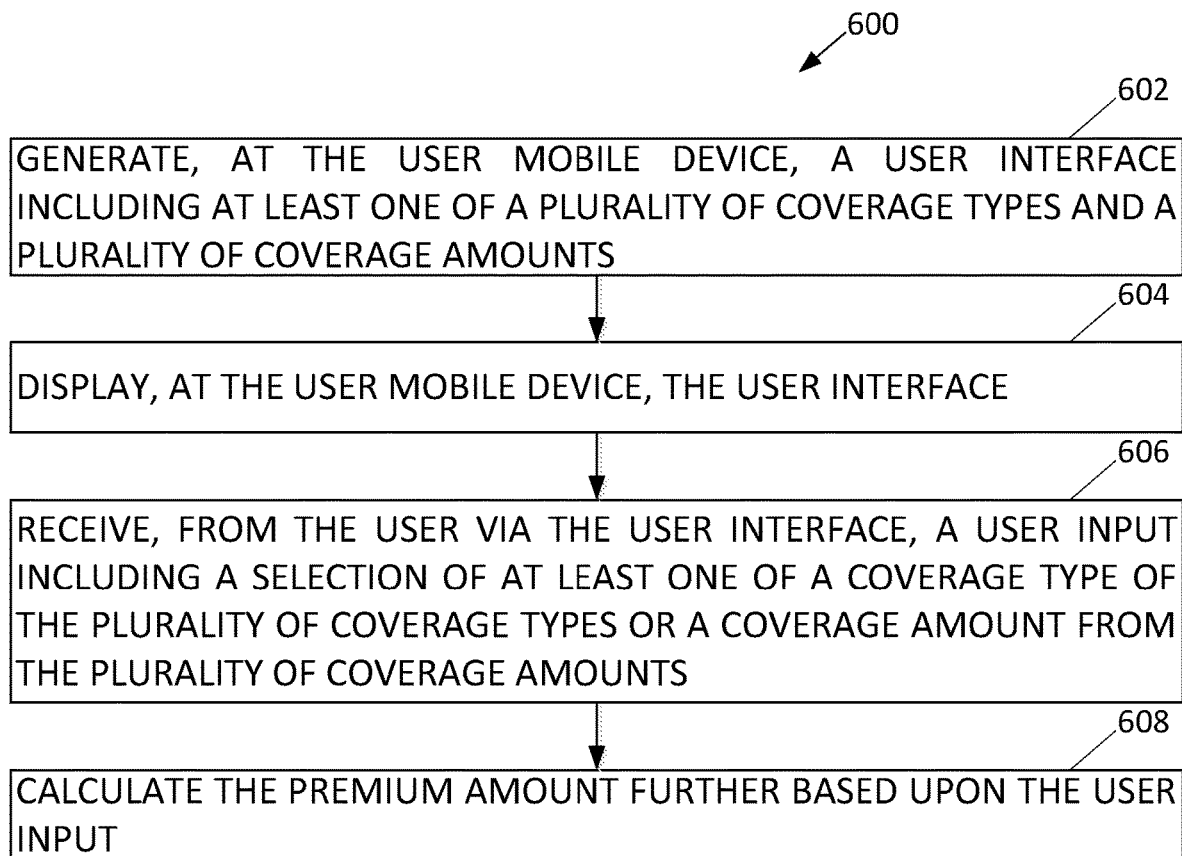
FIG. 6 illustrates an exemplary computer-implemented method for providing a user interface that may be performed by the TA system illustrated in FIG. 1.

FIG. 6 illustrates an exemplary computer-implemented method 500 for providing a user interface that may be may be implemented using one or more components of TA system 100 (shown in FIG. 1).

Computer-implemented method 600 may include generating 602, at the user mobile device, a user interface including at least one of a plurality of coverage types and a plurality of coverage amounts. In some embodiments, generating 602 the user interface may be performed by TA computing device 102 (shown in FIG. 1), for example, by executing communication module 330 (shown in FIG. 3).

Computer-implemented method 600 may further include displaying 604, at the user mobile device, the user interface. In some embodiments, displaying 604 the user interface may be performed by TA computing device 102, for example, by executing communication module 330.

Computer-implemented method 600 may further include receiving 606, from the user via the user interface, a user input including a selection of at least one of a coverage type of the plurality of coverage types or a coverage amount from the plurality of coverage amounts. In some embodiments, receiving 606 the input from the user may be performed by TA computing device 102, for example, by executing communication module 330. In some embodiments, the user input may include a coverage amount.

Computer-implemented method 600 may further include calculating 608 the premium amount further based upon the user input. In some embodiments, calculating 608 the premium amount may be performed by TA computing device 102, for example, by executing analytics module 334 (shown in FIG. 3).

Exemplary Method for Determining an Insurance Premium Using the TA System

Figure 7:
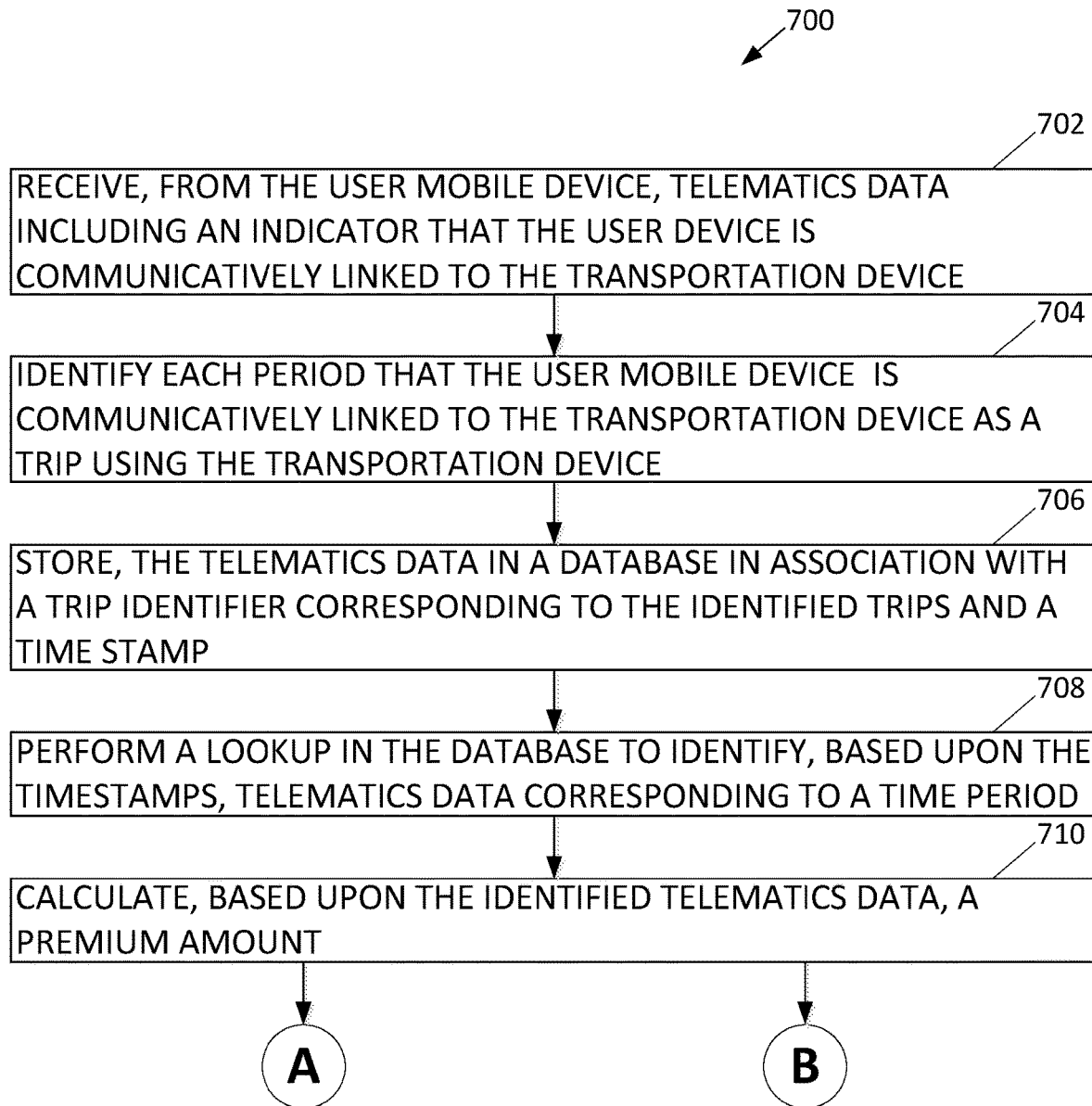
FIG. 7 illustrates an exemplary computer-implemented method for determining an insurance premium that may be performed by the TA system illustrated in FIG. 1.
Figure 8:
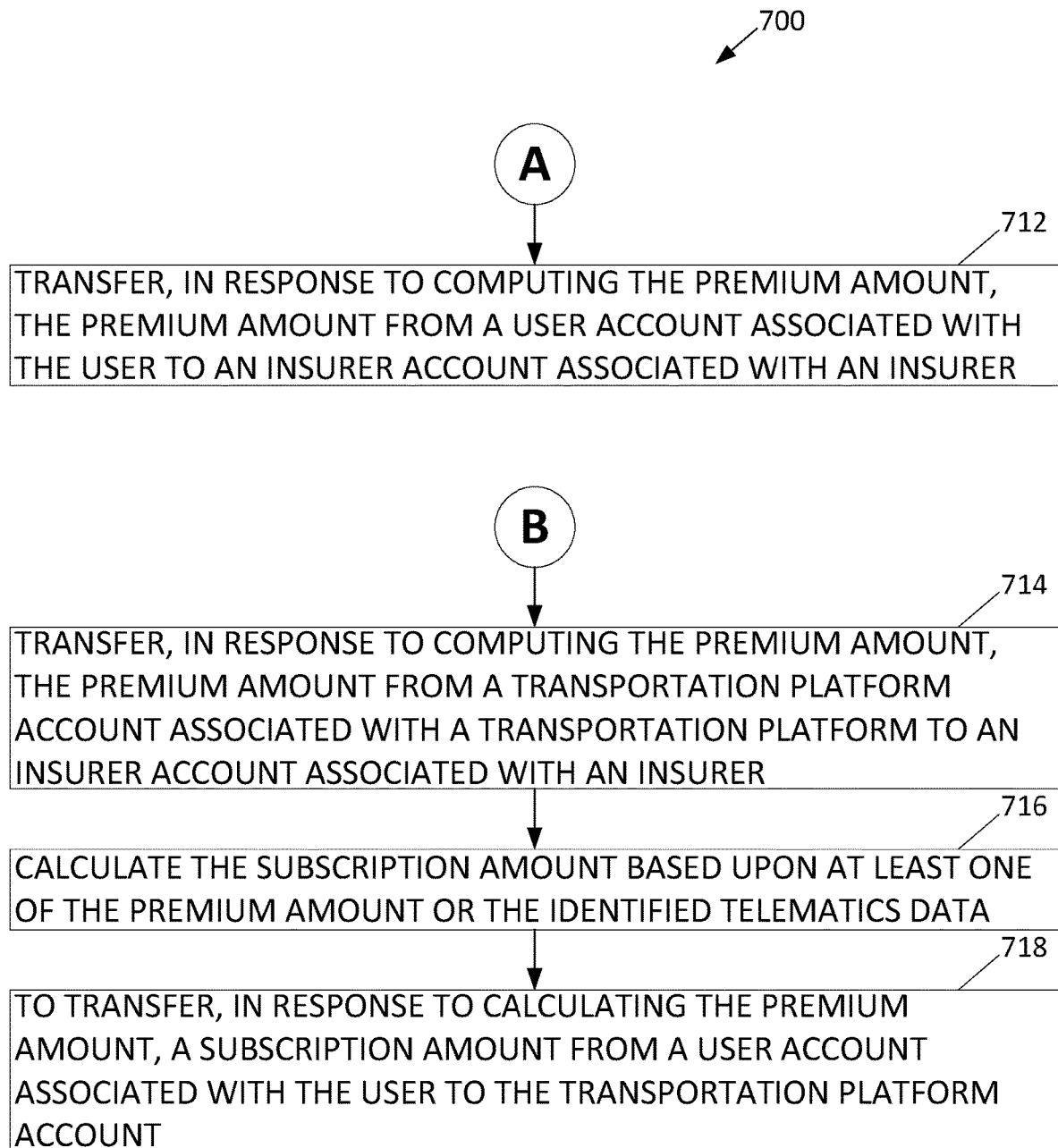
FIG. 8 is a continuation of the exemplary computer-implemented method shown in FIG. 7.

FIGS. 7 and 8 illustrate an exemplary computer-implemented method 500 for determining an insurance premium of that may be may be implemented using one or more components of TA system 100 (shown in FIG. 1).

Computer-implemented method 700 may include receiving 702, from the user mobile device, telematics data including an indicator that the user mobile device is communicatively linked to the transportation device. In some embodiments, receiving 702 the telematics data may be performed by TA computing device 102 (shown in FIG. 1), for example, by executing communication module 330 (shown in FIG. 3). In some embodiments, the transportation device may be at least one of a motor vehicle, a bicycle, and/or an electric scooter. In some embodiments, the user mobile device may be configured to be communicatively linked to the transportation device via at least one of a physical coupling or a wireless coupling Computer-implemented method 700 may further include identifying 704 each period that the user mobile device is communicatively linked to the transportation device as a trip using the transportation device. In some embodiments, identifying 704 each period as a trip may be performed by TA computing device 102, for example, by executing analytics module 334 (shown in FIG. 3).

Computer-implemented method 700 may further include storing 706, the telematics data in a database in association with a trip identifier corresponding to the identified trips and a time stamp. In some embodiments, storing 706 the telematics data may be performed by TA computing device 706, for example, by executing data management module 332 (shown in FIG. 3).

Computer-implemented method 700 may further include performing 708 a lookup in the database to identify, based upon the timestamps, telematics data corresponding to a time period. In some embodiments, performing 708 the lookup may be performed by TA computing device 102, for example, by executing data management module 332.

Computer-implemented method 700 may further include calculating 710, based upon the identified telematics data, a premium amount. In some embodiments, calculating 710 the premium amount may be performed by TA computing device 102, for example, by executing analytics module 334.

In some embodiments, computer-implemented method 700 may further include transferring 712, in response to computing the premium amount, the premium amount from a user account associated with the user to an insurer account associated with an insurer. In some embodiments, transferring 712 the premium amount may be performed by TA computing device 102, for example, by executing funds transfer module 336 (shown in FIG. 3).

In some embodiments, computer-implemented method 700 may further include transferring 714, in response to computing the premium amount, the premium amount from a transportation platform account associated with a transportation platform to an insurer account associated with an insurer. In some embodiments, transferring 714 the premium amount may be performed by TA computing device 102, for example, by executing funds transfer module 336.

In some such embodiments, computer-implemented method 700 may further include calculating 716 the subscription amount based upon at least one of the premium amount or the identified telematics data. In some embodiments, calculating 716 the subscription amount may be performed by TA computing device 102, for example, by executing analytics module 334.

In some such embodiments, computer-implemented method 700 may further include transferring 718, in response to calculating the premium amount, a subscription amount from a user account associated with the user to the transportation platform account. In some embodiments, transferring 718 the subscription amount may be performed by TA computing device 102, for example, by executing funds transfer module 336.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, TA computing device 102 is configured to implement machine learning, such that TA computing device 102 "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to telematics data and user input received from user mobile device 108. ML outputs may include but are not limited to insurance premium amounts calculated based upon the received telematics data. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of conversation data with known characteristics or features. Such information may include, for example, information associated with a plurality of different speaking styles and accents.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Based upon these analyses, the processing element may learn how to identify characteristics and patterns that may then be applied to analyzing telematics data. For example, the processing element may learn, with the user's permission or affirmative consent, to identify an amount of risk associated with the user's actual transportation behavior. This information may be used to calculate an insurance premium based upon the user's transportation activity.

Exemplary Embodiments

In one aspect, a TA computing device may be provided. The TA computing device may include at least one processor and/or associated transceiver in communication with at least one memory device. The at least one processor and/or associated transceiver may be configured to: (1) receive, from a user mobile device corresponding to a user, telematics data corresponding to a trip taken using a transportation platform; (2) store, for each trip, the telematics data in a database in association with a trip identifier and a timestamp; (3) perform a lookup in the database to identify, based upon the timestamps, telematics data corresponding to a time period; (4) calculate, in response to identifying the telematics data, based upon the identified telematics data, a premium amount; and/or (5) transfer, in response to calculating the premium amount, the premium amount from a transportation platform account associated with the transportation platform to an insurer account associated with an insurer. The TA computing device may include additional, less, or alternate functionality, including that discussed elsewhere herein.

In some embodiments at least one processor may be further configured to transfer, in response to calculating the premium amount, a subscription amount from a user account associated with the user to the transportation platform account.

In some embodiments, the at least one processor may be further configured to calculate the subscription amount based upon at least one of the premium amount or the identified telematics data.

In some embodiments, the at least one processor may be further configured to: generate, at the user mobile device, a user interface including at least one of a plurality of coverage types and a plurality of coverage amounts; and display, at the user mobile device, the user interface.

In some embodiments, the at least one processor may be further configured to: receive, from the user via the user interface, a user input including a selection of at least one of a coverage type of the plurality of coverage types or a coverage amount from the plurality of coverage amounts; and calculate the premium amount further based upon the user input.

In some embodiments, the user input may include a coverage amount.

In some embodiments, the transportation platform may correspond to a transportation network company (TNC), and wherein at least some of the trips correspond to rides taken by the user with the TNC.

In some embodiments, the user mobile device may be communicatively linked to a transportation device, and wherein at least some of the trips correspond to rides taken by the user using the transportation device.

In some embodiments, the transportation device may include at least one of a motor vehicle, a bicycle, or powered scooter.

In another aspect, a computer-implemented method for transportation analytics may be provided. The computer-implemented method may be performed by a transportation analytics (TA) computing device including at least one processor and/or associated transceiver in communication with at least one memory device. The computer-implemented method may include (1) receiving, by the TA computing device, from a user mobile device corresponding to a user, telematics data corresponding to a trip taken using a transportation platform; (2) storing, by the TA computing device, for each trip, the telematics data in a database in association with a trip identifier and a timestamp; (3) performing, by the TA computing device, a lookup in the database to identify, based upon the timestamps, telematics data corresponding to a time period; (4) calculating, by the TA computing device, in response to identifying the telematics data, based upon the identified telematics data, a premium amount; and/or (5) transferring, by the TA computing device, in response to calculating the premium amount, the premium amount from a transportation platform account associated with the transportation platform to an insurer account associated with an insurer. The computer-implemented method may include additional, less, or alternate actions, including those discussed elsewhere herein.

In some embodiments, the computer-implemented method may further include transferring, by the TA computing device, in response to calculating the premium amount, a subscription amount from a user account associated with the user to the transportation platform account.

In some embodiments, the computer-implemented method may further include calculating, by the TA computing device, the subscription amount based upon at least one of the premium amount or the identified telematics data.

In some embodiments, the computer-implemented method may further include: generating, by the TA computing device, at the user mobile device, a user interface including at least one of a plurality of coverage types and a plurality of coverage amounts; and displaying, by the TA computing device, at the user mobile device, the user interface.

In some embodiments, the computer-implemented method may further include: receiving, by the TA computing device, from the user via the user interface, a user input including a selection of at least one of a coverage type of the plurality of coverage types or a coverage amount from the plurality of coverage amounts; and calculating, by the TA computing device the premium amount further based upon the user input.

In some embodiments, the user input may include a coverage amount.

In some embodiments, wherein the transportation platform may correspond to a transportation network company (TNC), and wherein at least some of the trips correspond to rides taken by the user with the TNC.

In some embodiments, the user mobile device may be communicatively linked to a transportation device, and wherein at least some of the trips correspond to rides taken by the user using the transportation device.

In some embodiments, the transportation device may include at least one of a motor vehicle, a bicycle, or powered scooter.

In another aspect, at least one non-transitory computer-readable media having computer-executable instructions embodied thereon may be provided. When executed by a transportation analytics (TA) computing device including at least one processor and/or associated transceiver in communication with at least one memory device, the computer-executable instructions may cause the at least one processor and/or associated transceiver to (1) receive, from a user mobile device corresponding to a user, telematics data corresponding to a trip taken using a transportation platform; (2) store, for each trip, the telematics data in a database in association with a trip identifier and a timestamp; (3) perform a lookup in the database to identify, based upon the timestamps, telematics data corresponding to a time period; (4) calculate, in response to identifying the telematics data, based upon the identified telematics data, a premium amount; and/or (5) transfer, in response to calculating the premium amount, the premium amount from a transportation platform account associated with the transportation platform to an insurer account associated with an insurer. The computer-executable instructions may direct additional, less, or alternate functionality, including that discussed elsewhere herein.

In some embodiments, the computer-executable instructions may further cause the at least one processor to transfer, in response to calculating the premium amount, a subscription amount from a user account associated with the user to the transportation platform account.

In some embodiments, the computer-executable instructions may further cause the at least one processor to calculate the subscription amount based upon at least one of the premium amount or the identified telematics data.

In some embodiments, the computer-executable instructions may further cause the at least one processor to: generate, at the user mobile device, a user interface including at least one of a plurality of coverage types and a plurality of coverage amounts; and display, at the user mobile device, the user interface.

In some embodiments, the computer-executable instructions may further cause the at least one processor to: receive, from the user via the user interface, a user input including a selection of at least one of a coverage type of the plurality of coverage types or a coverage amount from the plurality of coverage amounts; and calculate the premium amount further based upon the user input.

In some embodiments, the user input may include a coverage amount.

In some embodiments, the transportation platform may correspond to a transportation network company (TNC), and wherein at least some of the trips correspond to rides taken by the user with the TNC.

In some embodiments, the user mobile device may be communicatively linked to a transportation device, and wherein at least some of the trips correspond to rides taken by the user using the transportation device.

In some embodiments, the transportation device may include at least one of a motor vehicle, a bicycle, or powered scooter.

In another aspect, a transportation analytics (TA) computing device may be provided. The TA computing device may include at least one processor and/or associated transceiver in communication with at least one memory device and a user mobile device corresponding to a user. The at least one processor and/or associated transceiver may be configured to (1) receive, from the user mobile device, telematics data including an indicator that the user mobile device is communicatively linked to a transportation device; (2) identify each period that the user mobile device is communicatively linked to the transportation device as a trip using the transportation device; (3) store, the telematics data in a database in association with a trip identifier corresponding to the identified trips and a time stamp; (4) perform a lookup in the database to identify, based upon the timestamps, telematics data corresponding to a time period; and/or (5) calculate, based upon the identified telematics data, a premium amount for insuring the user during the trips taken using the transportation device during the time period. The TA computing device may include additional, less, or alternate functionality, including that discussed elsewhere herein.

In some embodiments, the at least one processor may be further configured to transfer, in response to computing the premium amount, the premium amount from a user account associated with the user to an insurer account associated with an insurer.

In some embodiments, the at least one processor may be further configured to transfer, in response to computing the premium amount, the premium amount from a transportation platform account associated with a transportation platform to an insurer account associated with an insurer.

In some embodiments, the at least one processor may be further configured to transfer, in response to calculating the premium amount, a subscription amount from a user account associated with the user to the transportation platform account.

In some embodiments, the at least one processor may be further configured to calculate the subscription amount based upon at least one of the premium amount or the identified telematics data.

In some embodiments, the transportation device may include at least one of a motor vehicle, a bicycle, or powered scooter.

In some embodiments, the user mobile device may be configured to be communicatively linked to the transportation device via at least one of a physical coupling or a wireless coupling.

In another aspect, a computer-implemented method for transportation analytics may be provided. The computer-implemented method may be performed by a transportation analytics (TA) computing device including at least one processor and/or associated transceiver in communication with at least one memory device and a user mobile device corresponding to a user. The computer-implemented method may include (1) receiving, by the TA computing device, from the user mobile device, telematics data including an indicator that the user mobile device is communicatively linked to a transportation device; (2) identifying, by the TA computing device, each period that the user mobile device is communicatively linked to the transportation device as a trip using the transportation device; (3) storing, by the TA computing device, the telematics data in a database in association with a trip identifier corresponding to the identified trips and a time stamp; (4) performing, by the TA computing device, a lookup in the database to identify, based upon the timestamps, telematics data corresponding to a time period; and/or (5) calculating, by the TA computing device, based upon the identified telematics data, a premium amount for insuring the user during the trips taken using the transportation device during the time period. The computer-implemented method may include additional, less, or alternate actions, including those discussed elsewhere herein.

In some embodiments, the computer-implemented method may further include transferring, by the TA computing device, in response to computing the premium amount, the premium amount from a user account associated with the user to an insurer account associated with an insurer.

In some embodiments, the computer-implemented method may further include transferring, by the TA computing device, in response to computing the premium amount, the premium amount from a transportation platform account associated with a transportation platform to an insurer account associated with an insurer.

In some embodiments, the computer-implemented method may further include transferring, by the TA computing device, in response to calculating the premium amount, a subscription amount from a user account associated with the user to the transportation platform account.

In some embodiments, the computer-implemented method may further include calculating, by the TA computing device, the subscription amount based upon at least one of the premium amount or the identified telematics data.

In some embodiments the transportation device may include at least one of a motor vehicle, a bicycle, or powered scooter.

In some embodiments, the user mobile device may be configured to be communicatively linked to the transportation device via at least one of a physical coupling or a wireless coupling.

In another aspect, at least one non-transitory computer-readable media having computer-executable instructions embodied thereon may be provided. When executed by a transportation analytics (TA) computing device including at least one processor and/or associated transceiver in communication with at least one memory device and a user mobile device corresponding to a user, the computer-executable instructions may cause the at least one processor and/or associated transceiver to (1) receive, from the user mobile device, telematics data including an indicator that the user mobile device is communicatively linked to a transportation device; (2) identify each period that the user mobile device is communicatively linked to the transportation device as a trip using the transportation device; (3) store the telematics data in a database in association with a trip identifier corresponding to the identified trips and a time stamp; (4) perform a lookup in the database to identify, based upon the timestamps, telematics data corresponding to a time period; and/or (5) calculate, based upon the identified telematics data, a premium amount for insuring the user during the trips taken using the transportation device during the time period. The computer-executable instructions may direct additional, less, or alternate functionality, including that discussed elsewhere herein.

In some embodiments, the computer-executable instructions may further cause the at least one processor to transfer, in response to computing the premium amount, the premium amount from a user account associated with the user to an insurer account associated with an insurer.

In some embodiments, the computer-executable instructions may further cause the at least one processor to transfer, in response to computing the premium amount, the premium amount from a transportation platform account associated with a transportation platform to an insurer account associated with an insurer.

In some embodiments, the computer-executable instructions may further cause the at least one processor to transfer, in response to calculating the premium amount, a subscription amount from a user account associated with the user to the transportation platform account.

In some embodiments, the computer-executable instructions may further cause the at least one processor to calculate the subscription amount based upon at least one of the premium amount or the identified telematics data.

In some embodiments, the transportation device may include at least one of a motor vehicle, a bicycle, or powered scooter.

In some embodiments, the user mobile device may be configured to be communicatively linked to the transportation device via at least one of a physical coupling or a wireless coupling.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A transportation analytics (TA) computing device comprising at least one processor in communication with at least one memory device and a user mobile device corresponding to a user, the user mobile device configured to communicatively link to a plurality of transportation devices of different types, the at least one processor configured to:
   in response to the user mobile device being communicatively linked to a first transportation device of the plurality of transportation devices, the first transportation device in communication with a transportation platform, receive telematics data from the user mobile device that is collected by the user mobile device, the telematics data identifying the type of the first transportation device;
   identify a trip associated with a period of time that the user mobile device is communicatively linked to the first transportation device, the trip defined as the period of time from when the first transportation device is communicatively linked to the user mobile device to when the first transportation device ceases to be communicatively linked to the user mobile device;
   store the telematics data in a database in association with a trip identifier corresponding to the trip, an identifier representing the type of the first transportation device that is associated with the trip, and a first time stamp determined based on the period of time in which the first transportation device is communicatively linked to the user mobile device;
   perform a lookup in the database to identify, based upon time stamps including the first time stamp, telematics data corresponding to a time period;
   calculate, based upon the identified telematics data, a premium amount for insuring the user during the trips taken using the plurality of different types of transportation devices during the time period;
   periodically calculate a subscription amount based upon at least one of the premium amount or the identified telematics data, the subscription amount including at least the premium amount and indicating an amount to be transferred from the user to the transportation platform; and
   transfer the premium amount from a transportation platform account associated with the transportation platform to an insurer account associated with an insurer that provided insurance coverage for insuring the user during the time period.

2. The TA computing device of claim 1, wherein the at least one processor is further configured to transfer, in response to computing the premium amount, the premium amount from a user account associated with the user to an insurer account associated with an insurer.

3. The TA computing device of claim 1, wherein the at least one processor is further configured to periodically transfer, in response to calculating the subscription amount, the subscription amount from a user account associated with the user to the transportation platform account.

4. The TA computing device of claim 1, wherein the plurality of transportation devices include at least one of a motor vehicle, a bicycle, or powered scooter.

5. The TA computing device of claim 1, wherein the user mobile device is configured to be communicatively linked to the plurality of transportation devices via at least one of a physical coupling or a wireless coupling.

6. The TA computing device of claim 1, wherein the processor is further configured to:
   in response to the user mobile device being communicatively linked to a second transportation device of a different type than the first transportation device of the plurality of transportation devices, receive telematics data from the user mobile device that is collected by the user mobile device, the telematics data identifying the type of the second transportation device that is currently communicatively linked to the user mobile device;

identify a second trip associated with a second period of time that the user mobile device is communicatively linked to the second transportation device, the second trip defined as the second period of time from when the second transportation device is communicatively linked to the user mobile device to when the first transportation device ceases to be communicatively linked to the user mobile device; and store the telematics data in the database in association with a second trip identifier corresponding to the second trip, a second identifier representing the type of the second transportation device that is associated with the second trip, and a second time stamp determined based on the period of time in which the first transportation device is communicatively linked to the user mobile device.

7. A computer-implemented method for transportation analytics performed by a transportation analytics (TA) computing device including at least one processor in communication with at least one memory device and a user mobile device corresponding to a user, the user mobile device configured to communicatively link to a plurality of transportation devices of different types, the computer-implemented method comprising:

in response to the user mobile device being communicatively linked to a first transportation device of the plurality of transportation devices, the first transportation device in communication with a transportation platform, receiving, by the TA computing device telematics data from the user mobile device that is collected by the user mobile device, the telematics data identifying the type of the first transportation device;

identifying, by the TA computing device, a trip associated with a period of time that the user mobile device is communicatively linked to the first transportation device, the trip defined as the period of time from when the first transportation device is communicatively linked to the user mobile device to when the first transportation device ceases to be communicatively linked to the user mobile device;

storing, by the TA computing device, the telematics data in a database in association with a trip identifier corresponding to the trips, an identifier representing the type of the first transportation device that is associated with the trip, and a first time stamp determined based on the period of time in which the first transportation device is communicatively linked to the user mobile device;

performing, by the TA computing device, a lookup in the database to identify, based upon time stamps including the first time stamp, telematics data corresponding to a time period;

calculating, by the TA computing device, based upon the identified telematics data, a premium amount for insuring the user during the trips taken using the plurality of different types of transportation devices during the time period;

periodically calculating, by the TA computing device, a subscription amount based upon at least one of the premium amount or the identified telematics data, the subscription amount including at least the premium amount and indicating an amount to be transferred from the user to the transportation platform; and transferring, by the TA computing device, the premium amount from a transportation platform account associated with the transportation platform to an insurer account associated with an insurer that provided insurance coverage for insuring the user during the time period.

8. The computer-implemented method of claim 7, further comprising transferring, by the TA computing device, in response to computing the premium amount, the premium amount from a user account associated with the user to an insurer account associated with an insurer.

9. The computer-implemented method of claim 7, further comprising periodically transferring, by the TA computing device, in response to calculating the subscription amount, the subscription amount from a user account associated with the user to the transportation platform account.

10. The computer-implemented method of claim 7, wherein the plurality of transportation devices include at least one of a motor vehicle, a bicycle, or powered scooter.

11. The computer-implemented method of claim 7, wherein the user mobile device is configured to be communicatively linked to the plurality of transportation devices via at least one of a physical coupling or a wireless coupling.

12. At least one non-transitory computer-readable media having computer-executable instructions embodied thereon, wherein when executed by a transportation analytics (TA) computing device including at least one processor in communication with at least one memory device and a user mobile device corresponding to a user, the user mobile device configured to communicatively link to a plurality of transportation devices of different types, the computer-executable instructions cause the at least one processor to:

in response to the user mobile device being communicatively linked to a first transportation device of the plurality of transportation devices, the first transportation device in communication with a transportation platform, receive telematics data from the user mobile device that is collected by the user mobile device, the telematics data identifying the first transportation device;

identify a trip associated with a period of time that the user mobile device is communicatively linked to the first transportation device, the trip defined as the period of time from when the first transportation device is communicatively linked to the user mobile device to when the first transportation device ceases to be communicatively linked to the user mobile device;

store the telematics data in a database in association with a trip identifier corresponding to the trips, an identifier representing the type of the first transportation device that is associated with the trip, and a first time stamp determined based on the period of time in which the first transportation device is communicatively linked to the user mobile device;

perform a lookup in the database to identify, based upon time stamps including the first time stamp, telematics data corresponding to a time period;

calculate, based upon the identified telematics data, a premium amount for insuring the user during the trips taken using the plurality of different types of transportation devices during the time period;

periodically calculate a subscription amount based upon at least one of the premium amount or the identified telematics data, the subscription amount including at least the premium amount and indicating an amount to be transferred from the user to the transportation platform; and transfer the premium amount from a transportation platform account associated with the transportation platform to an insurer account associated with an insurer that provided insurance coverage for insuring the user during the time period.

13. The at least one non-transitory computer-readable media of claim 12, wherein the computer-executable instructions further cause the at least one processor to transfer, in response to computing the premium amount, the premium amount from a user account associated with the user to an insurer account associated with an insurer.

14. The at least one non-transitory computer-readable media of claim 12, wherein the computer-executable instructions further cause the at least one processor to periodically transfer, in response to calculating the subscription amount, the subscription amount from a user account associated with the user to the transportation platform account.

\* \* \* \* \*